US007441243B2

(12) United States Patent
Fellenstein et al.

(10) Patent No.: US 7,441,243 B2
(45) Date of Patent: Oct. 21, 2008

(54) EXCEPTION HANDLING IN THE PROCESSING OF PROPOSAL REQUESTS IN A GRID COMPUTING ENVIRONMENT

(75) Inventors: Craig W Fellenstein, Brookfield, CT (US); Rick Allen Hamilton, II, Charlottesville, VA (US); Joshy Joseph, Poughkeepsie, NY (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 10/865,700

(22) Filed: Jun. 10, 2004

(65) Prior Publication Data

US 2006/0020939 A1 Jan. 26, 2006

(51) Int. Cl.
*G06F 9/50* (2006.01)
*G06F 11/07* (2006.01)

(52) U.S. Cl. ................................ 718/104; 714/1
(58) Field of Classification Search ................ 718/104; 714/1
See application file for complete search history.

(56) References Cited

U.S. PATENT DOCUMENTS

| 3,593,300 | A * | 7/1971 | Driscoll et al. ............. 718/104 |
| 6,353,846 | B1 * | 3/2002 | Fleeson ....................... 718/104 |
| 6,480,879 | B1 * | 11/2002 | Zinky et al. ................. 709/201 |
| 6,842,899 | B2 * | 1/2005 | Moody et al. ............... 718/100 |
| 2002/0032716 | A1 * | 3/2002 | Nagato ........................ 709/104 |
| 2005/0005272 | A1 * | 1/2005 | Moody et al. ............... 718/104 |

OTHER PUBLICATIONS

Foster, I., Kesselman, C., Tuecke, S., "The Anatomy of the Grid: Enabling Scalable Virtual Organizations", The International Journal of High Performance Computing Applications, vol. 15, No. 3, Fall 2001, pp. 200-222.*

* cited by examiner

*Primary Examiner*—Meng-Ai An
*Assistant Examiner*—Kwok W Lee
(74) *Attorney, Agent, or Firm*—Cas Salys; Anthony V.S. England

(57) ABSTRACT

A system, method, and service associated with a computing grid or a virtual organization include a request for proposal (RFP) generator, where the RFP describes a data processing task. The RFP is provided to multiple resource providers via the computing grid where each of the resource providers is potentially suitable for performing the data processing task on behalf of the resource consumer. An RFP response processor receives and evaluates RFP responses generated by one or more of the resource providers. An exception processor accessible to the RFP response processor evaluates any exception in the RFP to determine if the exception disqualifies the RFP response. The exceptions may include, for example, job time limit exceptions, resource requirement exceptions, hardware/software platform requirement exceptions and others. Exception rules may be defined to guide the evaluation of the exception.

19 Claims, 4 Drawing Sheets

EXCEPTION HANDLING IN THE PROCESSING OF PROPOSAL REQUESTS IN A GRID COMPUTING ENVIRONMENT

BACKGROUND

1. Field of the Present Invention

The present invention is in the field of grid computing and more particularly, exception processing in grid computing environments.

2. History of Related Art

Grid computing refers generally to a computation network including tools and protocols for coordinated resource sharing and problem solving among pooled assets. These pooled assets, sometimes referred to as virtual organizations, can be connected to a local network or distributed across the globe. A virtual organization is typically characterized as heterogeneous (perhaps including PCs, servers, mainframes, and/or supercomputers), pseudo-autonomous (a given grid could potentially access resources in different organizations), and temporary. Gird computing is described in a variety of publications including, for example, I. Foster et al., *The Anatomy of the Grid, Enabling Scalable Virtual Organizations*, Intl. J. of Supercomputing Applications and High Performance Computing (Fall 2001).

Automated systems are being developed to make grid computing a cost effective and efficient part of everyday computing. One application of particular interest for information technology managers is the concept of on-demand grid computing in which a service requester specifies a data processing task and solicits bids from multiple providers that are part of a particular grid. Within this disclosure, the term "Request for Proposal" (RFP) refers to the mechanism by which a resource requestor (consumer or enterprise) makes known its need for data processing resources and RFP responses refer to the responses generated by grid vendors or resource providers.

Because grid computing is an emerging field, many aspects of grid computing are, at present, rudimentary. Currently, manual inspection of each RFP response is required prior to a purchase decision. In addition, if a particular RFP response contains one or more exceptions, an administrator would have to process each of the exceptions to determine if the RFP response is otherwise eligible for consideration. If, for example, an RFP specifies that a particular task must be completed in 24 hours and an RFP response indicates an estimated completion time of 28 hours, an administrator would be required to determine if the RFP response should be considered or discarded. It would be desirable to implement a gird computing environment in which RFP responses and, specifically, exceptions contained within RFP response, were processed automatically.

SUMMARY OF THE INVENTION

The objective identified above is addressed in the present invention by a system, method, and service associated with a computing grid or a virtual organization that include a request for proposal (RFP) generator, where the generator produces an RFP that describes a data processing task. The RFP is provided to multiple resource providers via the computing grid where each of the resource providers is potentially suitable for performing the data processing task on behalf of the resource consumer. An RFP response processor receives and evaluates RFP responses generated by one or more of the resource providers. An exception processor accessible to the RFP response processor evaluates any exception in the RFP to determine if the exception disqualifies the RFP response. The exceptions may include, for example, job time limit exceptions, resource requirement exceptions, hardware/software platform requirement exceptions and others. Exception rules may be defined to guide the evaluation of the exception.

BRIEF DESCRIPTION OF THE DRAWINGS

Other objects and advantages of the invention will become apparent upon reading the following detailed description and upon reference to the accompanying drawings in which.

Figure 1:
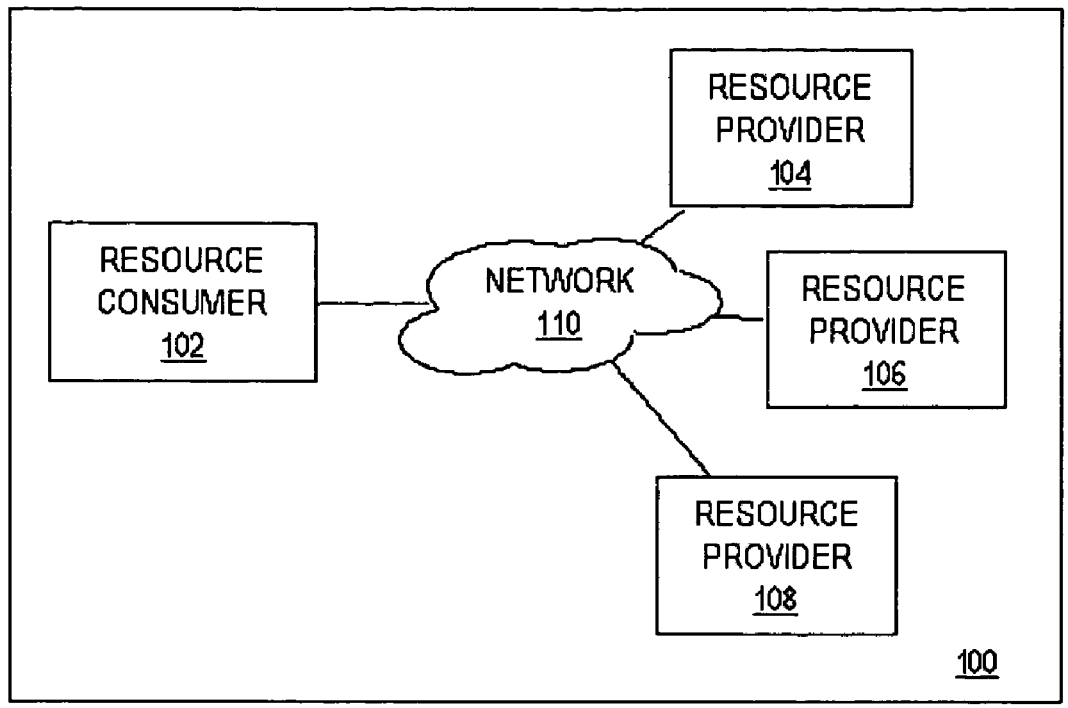
FIG. 1 is a block diagram of selected elements of a computing grid or virtual organization.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention provides a mechanism for automating the RFP process in a computing grid environment. More specifically, the invention is directed to automating the handling and processing of exception conditions in RFP responses. When a grid enabled service provider responds to an RFP, the response may include one or more conditions that are non-compliant with RFP requirements or parameters. The present invention defines a mechanism for automating the handling of such exceptions.

A fundamental feature of the computing grid concept is coordinated resource sharing and problem solving in dynamic, multi-institutional virtual organizations. In this context, sharing refers not so much to file exchange but rather to direct access to computers, software, data, and other resources, as is required by a variety of collaborative problem-solving and resource-brokering strategies that are emerging. This computing grid sharing is highly controlled, with resource providers and consumers defining what is shared, who is allowed to share, and the conditions under which sharing occurs. A set of individuals and/or institutions defined by such sharing rules form what is referred to as a virtual organization (VO).

Figure 2:
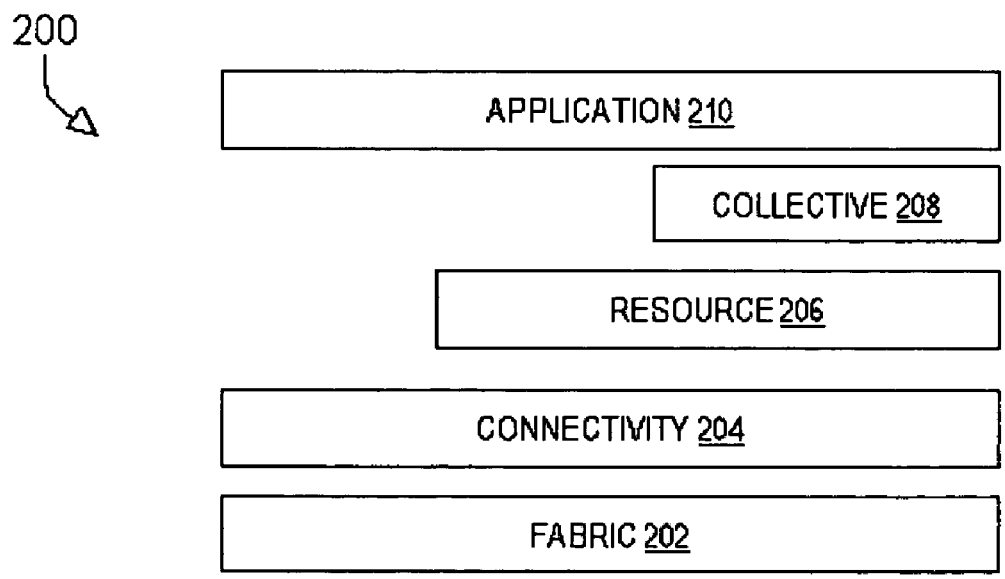
FIG. 2 illustrates selected elements of a component system of the computing grid depicted in FIG. 1.

Referring to FIG. 1 and FIG. 2, a computing grid 100 (also referred to herein as VO 100) is depicted as including a resource consumer 102 and a set of resource providers 104 through 108. Resource consumer 102 is connected to each of the resource providers 104-108 via a network 110. Each of the entities in VO 100 is implemented in compliance with a grid computing architectural model.

FIG. 2 illustrates selected components of a system 200 that is part of VO 100 as depicted in FIG. 1. The elements of system 200 as depicted in FIG. 2 correspond to like-named elements of the grid computing architectural model, in compliance with which system 200 is implemented. Thus, system 200 as depicted in FIG. 2 may represent either a resource consumer such as resource consumer 102 or a resource provider such as resource provider 104, 106, and 108 of FIG. 1. The elements of FIG. 2 are most likely implemented as computer code or computer software stored on a computer accessible medium such as a hard disk, system memory, or other form of persistent or dynamic storage. These architectural components are layered in a manner analogous to the manner in which Internet protocol components are layered, but include components (such as the resource and collective layers described below) that are beyond the scope of conventional Internet client-server models.

At the base of the grid computing architectural model is the fabric layer 202. Fabric layer 202 enables shared access to resources such as computational resources (e.g., CPU cycles), storage resources, network resources, database resources, and so forth. Fabric components implement the local, resource-specific operations that occur on specific resources as a result of sharing operations at higher levels. VO resources preferably implement enquiry mechanisms enabling grid entities to discover a resource's capabilities and state as well as management mechanisms that enable at least some control over the quality of service delivered by an entity.

Connectivity layer 204 defines communication and authentication protocols required for grid-specific network transactions. Communication protocols enable the exchange of data between fabric layer resources. Authentication protocols build on communication services to provide secure mechanisms for verifying the identity of users and resources. Communication requirements include transport, routing, and naming. These protocols may incorporate or leverage elements of the TCP/IP protocol stack, such as the IP, TCP, and DNS layers of the Internet layered protocol architecture. In addition to providing a communication mechanism, the TCP/IP protocol suite defines a number of security standards developed that are applicable in the grid computing environment.

Authentication mechanisms implemented within VO 100 preferably include "single sign on" mechanisms and "delegation" mechanisms. Single sign on refers to capabilities enabling a user to log on or otherwise authenticate just once and then have access to multiple resources within the computing grid. Delegation refers to the ability of a user to authorize a program to execute on behalf of the user so that the program is authorized to access resources to which the user has access.

Resource layer 206 extends the communication and authentication protocols of connectivity layer 204 to define protocols for the secure negotiation, initiation, monitoring, control, accounting, and payment of sharing operations on individual resources. Resource layer objects call fabric layer functions to access and control local resources. Resource layer 206 encompasses information protocols and management protocols.

Information protocols provide the mechanisms by which a resource consumer can obtain information about the state of a resource including, for example, the resource's configuration, loading, and cost. Management protocols are used to negotiate access to a shared resource, specifying, for example, resource requirements such as quality of service and the operation(s) to be performed, such as process creation, or data access. Management protocols must ensure that the requested protocol operations are consistent with the policy under which the resource is to be shared. Management protocols address considerations including accounting, payment, and operation status monitoring.

Whereas resource layer 206 is focused on interactions with a single grid resource, collective layer 208 encompasses protocols and services not associated with any specific resource but rather are global in nature and capture interactions across collections of resources. Collective layer services include, as just a few examples, discovery services, allocation/scheduling services, and software discovery services. Directory services allow VO entities to discover the existence and/or properties of VO resources. A directory service may allow its users to query for resources by name and/or by attributes such as type, availability, or load. Co-allocation, scheduling, and brokering services allow VO participants to request the allocation of one or more resources for a specific purpose and the scheduling of tasks on the appropriate resources. Software discovery services discover and select the best software implementation and execution platform based on the parameters of the problem being solved.

Application layer 210 includes the user applications that operate within a VO environment. Applications are constructed by calling upon services defined at the lower layers. At each layer, well-defined protocols provide access to some useful service such as resource management, data access, and resource discovery.

Is it important to distinguish VO 100 from conventional distributed computing implementations, such as those provided under world wide web (Web) and application service provider (ASP) models. Generally, conventional distributed computing approaches do not provide a general resource-sharing framework that addresses VO requirements. While the prevalence of Web technologies (e.g., TCP/IP, HTTP) and languages (e.g., HTML and XML) makes them attractive as a platform for constructing VO systems and applications, they lack features required for the richer interaction models that occur in VOs. For example, conventional Web browsers typically use Transport Layer Security (TLS) for authentication, but do not support single sign-on or delegation.

Conventional ASP implementations, similarly, do not address the specific requirements of general purpose VO implementations. For example, ASPs tend to handle security using Virtual Private Network (VPN) technology to extend a customer's intranet to encompass resources operated by the ASP on the customer's behalf. The use of VPN, unfortunately, makes it typically impossible for an ASP application to access data located on storage managed by a separate provider. Resource sharing across providers is virtually non-existent in the hosting industry. Unlike a VO, a VPN cannot extend dynamically to encompass other resources and does not provide resource providers with any control of when and whether to share its resources.

One computing grid application of importance is on-demand computational resource acquisition. On-demand computing, as the term is used herein, refers to a resource consumer's ability to identify or locate grid-provided computational resources in real time and negotiate with resource providers for the use of such resources. In a typical on-demand scenario, resource consumer 102 (FIG. 1) wants to obtain computational resources to perform a specific data processing task. For purposes of this disclosure, a data processing task may include data storage, Resource consumer 102 is typically constrained by one or more parameters such as the time frame in which the task must be completed and the cost that the resource consumer is willing or able to pay. Within a grid computing environment as described herein, resource consumer 102 is configured to seek out the resource provider best able to accommodate its needs by means of a virtualized, grid-based bidding mechanism. Aspects of an exemplary gird-based bidding mechanisms are disclosed in U.S. Patent Application entitled A computer Implemented Method for Automatically Controlling Selection Of A Grid Provider For A Grid Job (application Ser. No. 11/034,335, now pending), which is incorporated by reference herein (referred to herein as the "RFP Response application").

The RFP Response application identifies various fields or parameters that might be included within a virtual RFP submission and response system. These parameters include Capacity Upgrade on Demand (CUoD) eligibility, job time limits, resource limits, job completion requirements, grid alliances including any special pricing, job cost limit, software platform class, hardware platform class, data access/transport mechanism, data size, security requirements, and performance/latency requirements. In addition, the RFP and response may negotiate Quality of Service guarantees and Service Level Agreements, estimated job run times on the preferred platform, any applicable grid "sell off" or outsourcing policy, the RFP response time, and the job priority.

Figure 3:
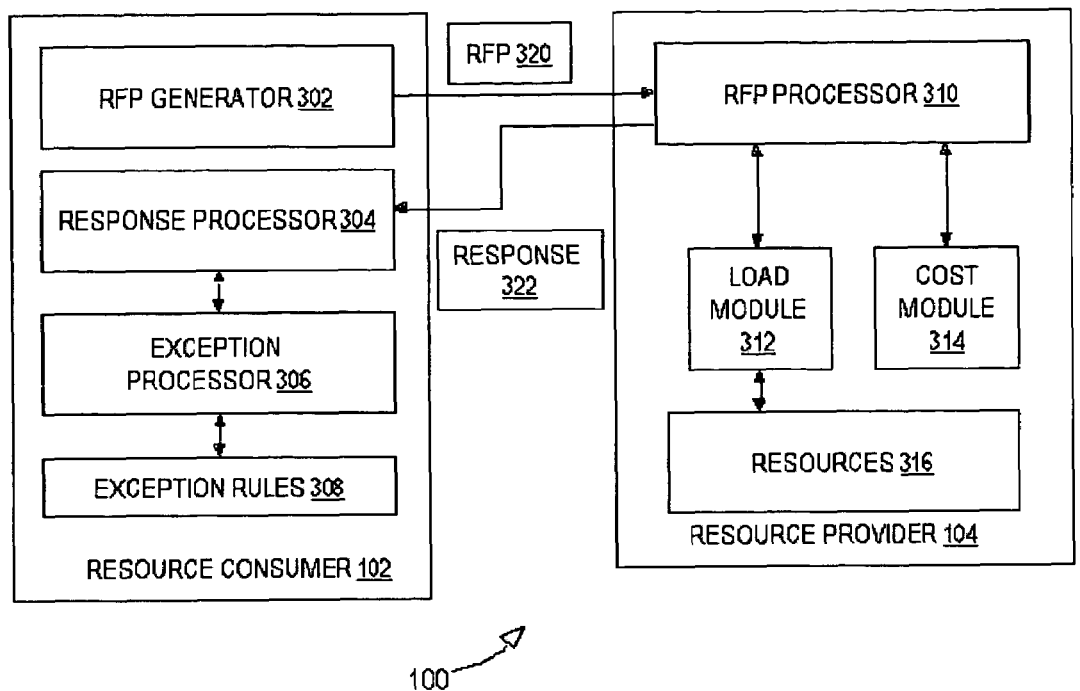
FIG. 3 is a block diagram of selected elements of computing grid components suitable for participating in a grid-based, virtual RFP and RFP response system.

Referring now to FIG. 3, selected elements of computing grid 100 suitable for processing RFP responses generated by resource providers are depicted. The elements depicted in FIG. 3 may be partially or entirely implemented as a set or sequence of computer executable instructions (i.e., computer software) stored on a volatile or persistent computer readable medium. In the depicted embodiment of computing grid 100, resource consumer 102 includes an RFP generator 302, a response processor 304, and an exception processor 306. The resource provider 104 includes an RFP processor 310 configured to receive an RFP 320 generated by RFP generator 302. RFP processor 310 has access to a load module 312 and a cost module 314 that facilitate the preparation of an appropriate RFP response 322. Specifically, RFP processor 310 is configured to extract selected workload and job cost information from RFP 320 and provide the information to load module 312 and cost module 314 respectively.

Workload module 312 is shown as having access to one or more computational resources 316 and is configured to determine the amount of workload required to process the task specified in RFP 320. Workload module 312 returns the determined load calculation to RFP processor 310, which forwards the workload information to cost module 314 along with cost information within RFP 320. Cost module 314 then determines a cost associated with performing the specified task and returns the cost information to RFP processor 310. RFP processor 310 sends a response 322 to resource consumer 102. The response 322 may be thought of as the resource provider's bid. In cases where RFP processor 310 determines that resource provider cannot comply with requirements specified in RFP 320, RFP processor 310 may return a "no bid" to resource consumer 102.

The present invention recognizes that the response 322 generated by resource provider 104 may not fully comply with values specified in RFP 320. Addressing this problem, the present invention provides a flexible, rules-based exception processor 306 for handling exceptions found in RFP responses 322. Exception processor 306 extends the functionality of computing grid 100 by enabling evaluation of noncompliant RFP responses. In some cases, the resource consumer may wish to consider RFP responses despite one or more exceptions contained in those bids. If, for example, an RFP response indicates a time to complete a specified task at a specified price slightly exceeding a time limit expressed in the RFP, the resource consumer may wish to waive the specified time limit requirement in the absence of a more competitive RFP response.

Exception processor 306 according to the present invention is preferably configured to detect one or more exceptions contained in an RFP response 322 received from a resource provider in response to an RFP issued by the resource consumer. In response to detecting one or more exceptions in an RFP response, exception processor 306 is enabled to access a set of dynamically adjustable exception rules 308 to determine whether the RFP response should be further evaluated or simply disqualified. In the event that exception processor 306 locates no rules within exception rules 308 associated with a particular exception, exception processor may disqualify the RFP response or, alternatively, alert an administrator and give the administrator an opportunity to define a rule for the particular exception. If exception processor 306 determines that none of the exceptions contained in an RFP response are fatal, exception processor 306 may return the RFP to response processor 304.

Examples of the types of processing that may be performed by exception processor 306 will now be described to illustrate the exception processing concept. It should be appreciated that the examples provided are not meant to be exhaustive and that all forms of exception processing in the RFP evaluation/selection process are within the scope of the present invention. Specific exception processing cases may evaluate exceptions associated with job time limits, resource limits, job completion requirements, and hardware and/or software platform classes. In the case of job time limits for example, an RFP 320 may specify a job time limit. A time limit of 120, for example, may restrict job run time to 120 minutes thereby indicating that the resource consumer needs the job completed within that time period. The job time limit may be associated with a resource consumer deadline or, in a case where grid services are billed based on time on the grid, a job time limit may reflect a budgetary consideration.

Exception processor 306 may include job time limit exception rules that permit the processor to evaluate job time limit exceptions contained in an RFP response. The RFP response may contain LOADtotal and RESOURCEtotal parameters indicating the estimated amount of workload associated with a task specified in a particular RFP as well as the amount of resources available to process the task. The LOADtotal, for example, may be expressed in terms of CPU cycles, bytes, or some other resource parameter while the RESOURCEtotal may be expressed in terms of available CPU cycles/hour or bytes/hour. In such a case, the exception processor 306 and exception rules 308 may include job time limit exception handling rules that permit exception processor 306 to evaluate an RFP response when the response does not comply with the RFP-specified job time limit. Imagine, as an example, that a resource provider generates an RFP response in which it specifies a LOADtotal and a RESOURCEtotal. Response processor 304 determines a value for TIMEtotal (the total time required for the resource provider to process the job) by dividing the LOADtotal by the RESOURCEtotal. Exception processor 306, in conjunction with exception rules 308, may then determine if the RFP response contains a job time exception by comparing the determined value of TIMEtotal with a TIMElimit value specified in the RFP. If exception processor 306 detects a job time limit exception (i.e., TIMEtotal>TIMElimit) it may set an exception condition (e.g., TIMEtotal=−1). Based on the rules in exception rules 308, exception processor 306 may then disqualify the RFP response or further evaluate the RFP response. Exception rules 308 may include, for example, a rule for job time limit exceptions by comparing the amount of time needed by the resource provider to complete the job to the amount of time specified by the resource consumer in the RFP. An example of such a rule might be:

[if] TIMEtotal=−1 [then] TIMEexception={TIMElimit/ (LOADtotal/RESOURCEtotal));
[if] TIMEexception>=0.90 [then] TIMEtotal={TIMElimit/TIMEexception} {exit 0} [elseif] TIMEexception>=0.85 [and if] LOWCOSTyes [then] TIMEtotal={TIMElimit/TIMEexception} {exit 0} [else] TIMEtotal=−1.

In this case, exception processor 306 modifies waives or forgives job time limit exceptions when the indicated amount of time required by the resource provider is within 10% of the time limit specified by the resource consumer or when the indicated amount of time required is within 15% of the time limit and the resource provider is also the lowest cost provider (as indicated by the Boolean variable LOWCOSTyes). Otherwise, the RFP response is disqualified.

This example illustrates the ability of the exception handling mechanism to determine whether to disqualify an exception condition based on the value of other parameters in the RFP response. In addition, example also illustrates the potential for intelligent and flexible, rules-based evaluation of RFP responses containing exceptions. Exception handling is this case is based on multiple parameters (e.g., time and cost) permitting powerful capabilities to evaluate RFP responses without administrative intervention. Only in the case when an exception is not addressed by an exception handling rule will an administrator be contacted. As dynamic exception rules 308 grows with time, it is contemplated that the number of RFP responses requiring administrative intervention will approach zero asymptotically.

A second example of exception handling involves evaluation of resource limit exceptions. In this example, an RFP may indicate a value (e.g., RESOURCElimit) limiting the amount of resources to be allocated to the specified task. Resource consumers may want to specify resource limits, for example, in the case of service providers that charge based on the amount of resources allocated to a task rather than the time required to complete the task. Using the RESOURCElimit parameter, an RFP may constrain the amount of resources to be dedicated to a job. In another instance, a resource consumer may wish to indicate a minimum level of resources to be dedicated to its task. Specifying a minimum level of dedicated resources might be desirable for service providers that charge based on the amount of time on the grid. If the level of resources to be allocated to a job is insufficient, the expense associated with performing the specified task might exceed the resource consumer's budget. Whether an RFP specifies an minimum resource limit value, a maximum resource limit value, or both, the resource providers may respond to the RFP by indicating the level of resources the resource provider is able to provide. If a response to an RFP containing a resource limit constraint does not comply with the resource limit specified in the RFP, response processor 304 (FIG. 2), in conjunction with one or more resource limit rules in exception rules 308, may evaluate the exception condition to determine whether to reject the RFP response or to reject. A resource limit rule in exception rules 308 might decide, for example, to consider an RFP response with a non-compliant value for resource limits if the response is otherwise compliant and the resource limit parameter specified in the response is within 75% of the resource limit required by the RFP.

Additional examples of RFP response parameters and exceptions that may be contemplated within response processor include task completion requirements and hardware and/or software platform requirements. A task completion requirement, contrasted with job time limit requirements, may specify a date and time when the task must be completed, including any verification of the task that is part of the RFP. Thus, whereas a job time limit requirement might constrain how much computational time is expended on a job, a task completion requirement might indicate a deadline for completing the job regardless of how much computational resources are expended. In the case of hardware and/or platform requirements, an RFP may specify or indicate a preference for a specific class of hardware platform. The resource provider may compare the requested or specified platform against every platform that the provider has available. If the provider does not have the requested platform available, the resource provider may indicate a different platform or set of platforms that are available. In such cases, the RFP response processor may detect the platform exception and process the RFP response according to appropriate rules. The rules engine 308 might, for example, include information indicating hardware/software platforms that are compatible with a given platform and the response processor may access the compatible platform information to determine if a platform exception should cause an RFP response to be disqualified.

Many other exception relationships are contemplated by the present invention. Parameters specified in an RFP may be determined from other parameters. As an example, a parameter indicating the amount of time required to process a job may be determined by a complex formula involving the amount of data, the platform, the number of records processed, the network-bandwidth needed, and so forth. In such cases, the exception processing may include the capability to evaluate the exception in terms of its component pieces.

Figure 4:
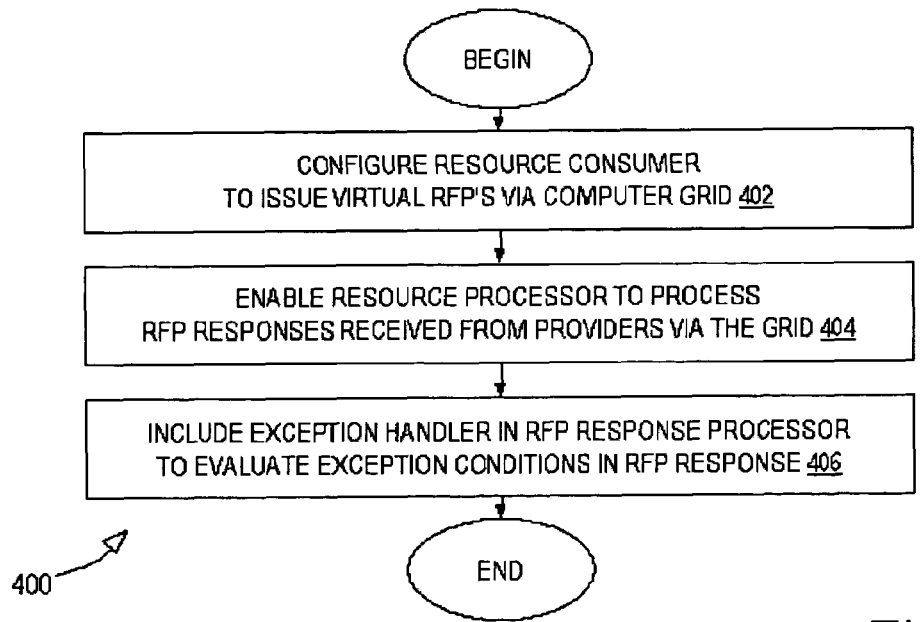
FIG. 4 is a flow diagram of a service for enabling a resource consumer in a computing grid to process RFP responses including evaluating exception conditions in the response.

One embodiment of the invention is implemented as a service provided to a customer that wants to incorporate exception handling into its grid-based RFP system. In this embodiment, selected elements of which are depicted in the flow diagram of FIG. 4, a service 400 may include configuring (block 402) a system to be suitable as a resource consumer within a VO or computing grid and, specifically, configuring the resource consumer to issue virtual RFP's to resource providers on the grid. Service 400 would further include enabling (block 404) a system to process response to virtual RFP's that are received from resource providers via the grid. In the depicted embodiment, service 400 further includes incorporating (block 406) an exception handler, most likely having access to an ordered set of exception rules, to process RFP response containing exceptions and determine whether the response must be disqualified because of the exception or if the response may be considered despite the presence of one or more exceptions. In some cases, blocks 402 and 404 (configuring RFP generation and RFP response handling techniques) may be performed independently of block 406, in which exception handling functionality is incorporated into an existing grid-based brokering system.

One embodiment of the invention is implemented as a set or sequence of computer executable instructions (software code) stored within a computer readable medium that is accessible to data processing system of a resource consumer within a VO or other computing grid. An example of such an embodiment is illustrated in the flow diagram of FIG. 5. The flow diagram represents the functionality of a computer program product 500 that is stored in a computer readable medium.

In the depicted embodiment, computer program product 500, during execution, enables a data processing system to generate a virtual RFP as depicted in block 502. The virtual RFP is then distributed (block 504) to preferably two or more resource or service providers that form the computing grid or VO. The resource consumer then monitors (block 506) for RFP responses being returned from one or more of the resource providers.

When an RFP response is received (block 508), the response is processed (block 510), most likely by a response processor such as the response processor 304 of FIG. 3. According to the present invention, the response processing performed in block 510 detects the presence of any exception conditions within the RFP response. If the response processor determines (block 512) that an RFP response contains one or more exceptions, each exception is evaluated (block 514) preferably through the use of an exception processor and an associated set of exception rules that are accessible to the response processor. The exception processing evaluates an exception condition to determine if the RFP is acceptable despite the exception condition(s) or whether the RFP response should be disqualified (block 518). If the exception processing determines that the RFP response is should be considered despite the exception condition, the RFP response is entered (block 520) such as by storing the RFP response in a database of acceptable RFP responses. If additional responses are expected (block 522), monitoring for RFP responses is resumed in block 506. If no additional responses are expected, response processing continues by evaluating (block 524) the database of acceptable RFP responses for the RFP response that best meets the needs of the RFP.

Figure 5:
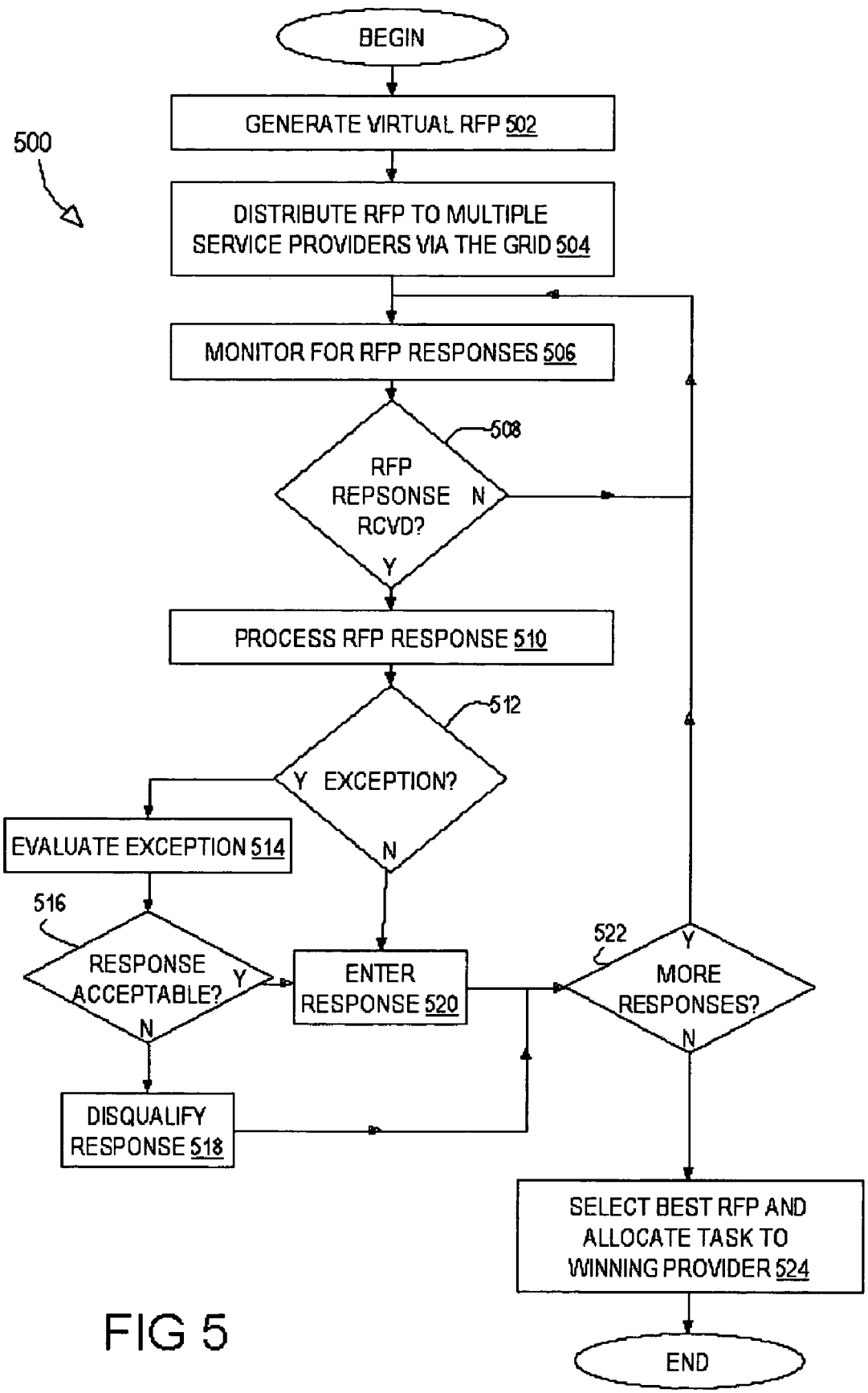
FIG. 5 is a flow diagram of a method of handling exceptions in RFP responses according to one embodiment of the present invention.
Figure 6:
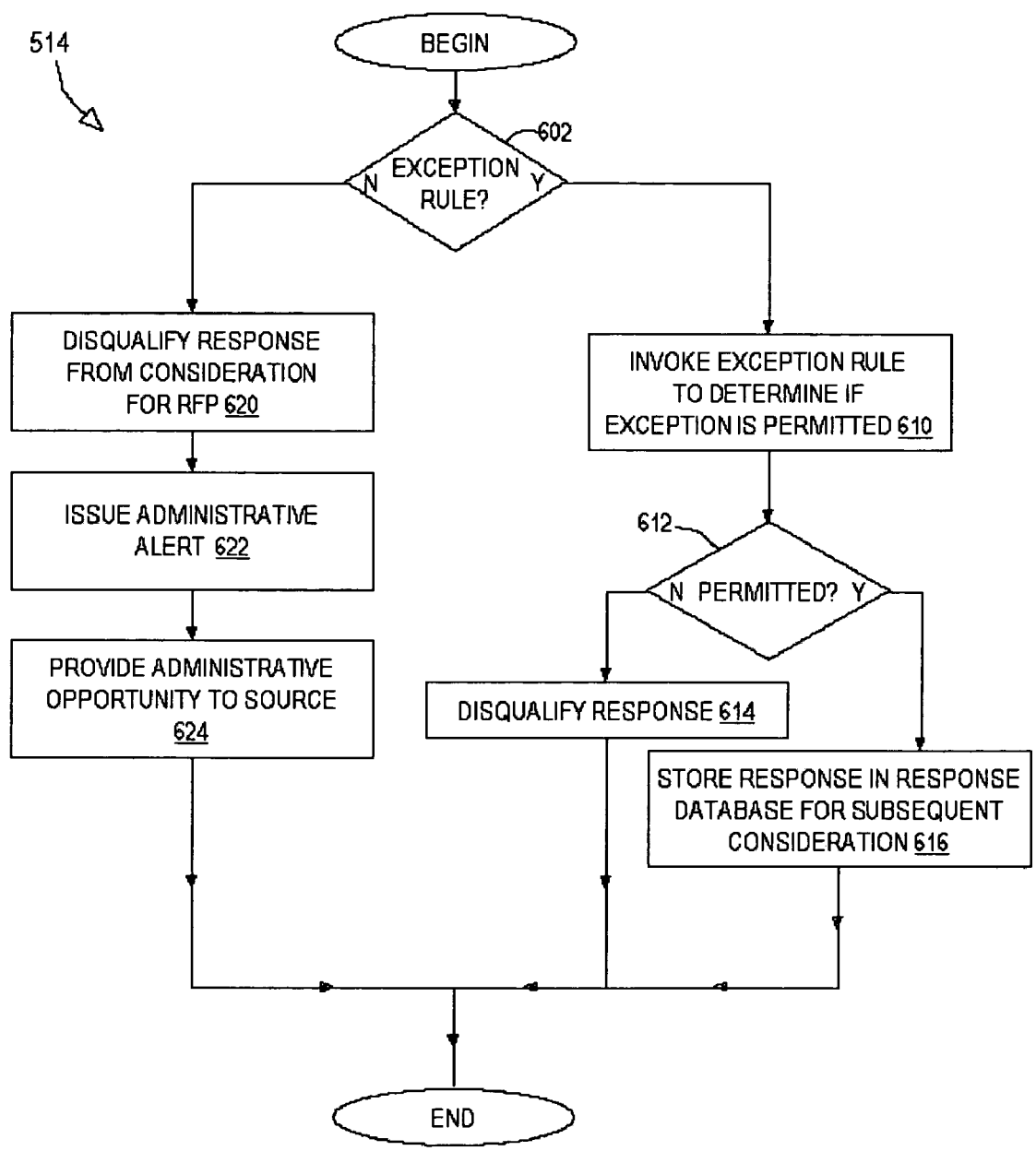
FIG. 6 is a flow diagram illustrating additional detail of an exception handling mechanism of FIG. 5.

Referring to FIG. 6, an embodiment of the exception processing indicated in block 514 of FIG. 5 is depicted. In this embodiment, the exception processing 514 includes determining (block 602) whether exception rules 308 contains a rule corresponding to the exception under consideration. If exception rules 308 does contain a pertinent rule, the rule is invoked (block 610) and used to decide (block 612) whether the exception disqualifies (block 614) the RFP response or whether the exception will be permitted (block 616) (i.e., the exception will be noted but will not ultimately disqualify the RFP response from being selected by the resource consumer).

If exception rules 308 does not contain a rule corresponding to the exception under consideration, the depicted embodiment of exception processing 514 disqualifies (block 620) the RFP response from further consideration and issues (block 622) an administrative alert to inform an administrator of the occurrence of an exception for which no rule exists. In this case, the administrator may be provided (block 624) with the opportunity to edit exception rules 308 to include an exception rule corresponding to the error condition under consideration.

It will be apparent to those skilled in the art having the benefit of this disclosure that the present invention contemplates a mechanism for enabling automated exception processing in the context of a computing grid-based architecture for generating virtual RFPs and for handling responses thereto. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A resource consumer computing apparatus in a computing grid, the apparatus comprising:
   a data processing system; and
   a storage device, wherein the storage device has stored thereon instructions for controlling the data processing system, and wherein the data processing system is operative with the instructions to execute the instructions for performing the steps of:
   authenticating the apparatus and a plurality of resource provider computing devices ("resource providers"), wherein the apparatus signs on for the authenticating such that the signing on consists of a single sign-on, enabling the resource consumer apparatus to authenticate once and have access to the plurality of resource providers;
   generating a request for proposal ("RFP"), the RFP being descriptive of a data processing task, wherein the task includes the resource consumer apparatus directly accessing resources of selected ones of the resource providers, and wherein the generated RFP has an associated performance requirement defining a required minimum or maximum in a measure of achievement for the performance of the task and the generated RFP identifies performance capability and resource parameters for the task and notifies the resource providers to send the resource consumer apparatus respective responses defining respective resources and performance capabilities of the respective resource providers according to the identified parameters, so that the resource consumer apparatus can evaluate the responses in order to select which of the resource providers and which of the resource provider resources to directly access for performing the task;
   sending the RFP to the plurality of resource providers via the computing grid;
   receiving and evaluating, by an RFP processor of the resource consumer apparatus, an RFP response generated by one of the resource providers responsive to the RFP, wherein the receiving and evaluating are before the resource consumer apparatus selects which of the resource providers to access to perform the task, and the evaluating includes the RFP processor computing a performance capability measure for the one responding resource provider, the performance capability measure computing being responsive to definitions of the parameters in the received RFP response;
   comparing, by the RFP processor, the computed performance capability measure to the predetermined performance requirement, wherein the RFP processor detects an exception for the RFP if the comparing indicates the computed performance capability measure is less than the required minimum, greater than the required maximum, or outside the required range; and
   evaluating the detected exception for the RFP by an exception processor of the resource consumer apparatus, wherein responsive to evaluating the exception the exception processor selects from among actions including i) disqualifying the RFP response and ii) waiving the exception, so that even if an exception is detected, selection of a resource provider for performance of the data processing task is enabled responsive to the detected exception being waived.

2. The apparatus of claim 1, wherein the data processing system is further operative with the instructions for performing the additional step of:
   discovering resources of the resource providers by a fabric layer; and
   wherein the authenticating includes:
   verifying identities of resource providers and the resource consumer apparatus.

3. The apparatus of claim 2, wherein the steps further comprise:

authorizing a program to execute on behalf of the user wherein the program is authorized to access resources to which the user has access.

4. The apparatus of claim 3, wherein the RFP response processor includes an exception rules database containing rules for handling specified exceptions in the RFP response.

5. The apparatus of claim 4, wherein the exception rules database includes exception rules for handling job time exceptions, resource limitation exceptions, and hardware or software platform exceptions in the RFP response.

6. The apparatus of claim 5, wherein the RFP processor is configured to issue an administrative alert if the exception rules database contains no rules for a particular exception.

7. The apparatus of claim 6, wherein the RFP response processor is configured to disqualify an RFP response if the RFP response contains an exception for which the exception rule database contains no rule or the exception is not permitted under a corresponding exception rule.

8. A method for enabling a data processing system to perform as a virtual organization resource consumer apparatus in a virtual organization, comprising:

authenticating the resource consumer apparatus and a plurality of resource provider computing devices ("resource providers"), wherein the resource consumer apparatus signs on for the authenticating such that the signing on consists of a single sign-on, enabling the resource consumer apparatus to authenticate once and have access to the plurality of resource providers;

configuring the resource consumer apparatus to generate and issue a request for proposal (RFP) to a plurality of resource providers associated with the virtual organization, the RFP being descriptive of a data processing task, wherein the task includes the resource consumer apparatus directly accessing resources of selected ones of the resource providers, and wherein the generated RFP has an associated performance requirement defining a required minimum or maximum in a measure of achievement for the performance of the task and the generated RFP identifies performance capability and resource parameters for the task and notifies the resource providers to send the resource consumer apparatus respective responses defining respective resources and performance capabilities of the respective resource providers according to the identified parameters, so that the resource consumer apparatus can evaluate the responses in order to select which of the resource providers and which of the resource provider resources to directly access for performing the task;

providing the resource consumer apparatus with an RFP response processor configured to receive and evaluate a response to the RFP generated by one of the resource providers to select one of a plurality of RFP responses, wherein the receiving and evaluating are before the resource consumer apparatus selects which of the resource providers to access to perform the task, and the evaluating includes the RFP processor computing a performance capability measure for the one responding resource provider, the performance capability measure computing being responsive to definitions of the parameters in the received RFP response;

configuring the RFP response processor to compare the computed performance capability measure to the predetermined performance requirement, wherein the RFP processor detects an exception for the RFP if the comparing indicates the computed performance capability measure is less than the required minimum, greater than the required maximum, or outside the required range; and providing the resource consumer apparatus with an exception processor configured to evaluate the detected exception, wherein responsive to evaluating the exception the exception processor selects from among actions including i) disqualifying the RFP response and ii) waiving the exception, so that even if an exception is detected, selection of a resource provider for performance of the data processing task is enabled responsive to the detected exception being waived.

9. The method of claim 8, further comprising:
configuring the resource consumer apparatus to discover virtual organization resources; and
wherein the authenticating includes:
verifying identities of the resource providers and the resource consumer apparatus.

10. The method of claim 8, further comprising enabling the resource consumer apparatus to authorize a program to execute on behalf of the user wherein the program is authorized to access resources to which the user has access.

11. The method of claim 10, wherein providing the resource consumer apparatus with an RFP response processor includes providing the resource consumer apparatus with an exception rules database containing rules for handling specified exceptions in the RFP response.

12. The method of claim 11, wherein the exception rules database includes exception rules for handling exceptions characterized as job time exceptions, resource limitation exceptions, and hardware or software platform exceptions.

13. The method of claim 12, further comprising configuring the RFP processor to issue an administrative alert if the exception rules database contains no rules for a particular exception.

14. The method of claim 13, further comprising configuring the RFP response processor to disqualify an RFP response if the RFP response contains an exception for which the exception rule database contains no rule or the exception is not permitted under a corresponding exception rule.

15. A computer program product, stored on a computer readable medium, the computer program product having instructions for execution by a data processing system to delegate a data processing task, wherein the instructions, when executed by the data processing system, cause the data processing system to implement a method comprising the steps of:

authenticating the resource consumer apparatus and a plurality of resource provider computing devices ("resource providers"), wherein the resource consumer apparatus signs on for the authenticating such that the signing on consists of a single sign-on, enabling the resource consumer apparatus to authenticate once and have access to the plurality of resource providers;

creating a request for proposal (RFP) describing the data processing task and for sending the RFP, via a computing grid, to a plurality of resource providers on the computing grid, wherein the task includes the resource consumer apparatus directly accessing resources of selected ones of the resource providers, and wherein the generated RFP has an associated performance requirement defining required minimum or maximum in a measure of achievement for the performance of the task and the generated RFP identifies performance capability and resource parameters for the task and notifies the resource providers to send the resource consumer apparatus respective responses defining respective resources and performance capabilities of the respective resource providers according to the identified parameters, so that the resource consumer apparatus can evaluate the responses in order to select which of the resource providers and which of the resource provider resources to directly access for performing the task; and receiving and evaluating, by an RFP processor of the resource consumer apparatus, an RFP response generated by one of the resource providers responsive to the RFP, wherein the receiving and evaluating are before the resource consumer apparatus selects which of the resource providers to access to perform the task, and the evaluating includes the RFP processor computing a performance capability measure for the one responding resource provider, the performance capability measure computing being responsive to definitions of the parameters in the received RFP response;

comparing the computed performance capability measure to the predetermined performance requirement, wherein a exception processor detects an exception for the RFP if the comparing indicates the computed performance capability measure is less than the required minimum, greater than the required maximum, or outside the required range; and evaluating the detected exception for the RFP by the exception processor of the resource consumer apparatus, wherein responsive to evaluating the exception the exception processor selects from among actions including i) disqualifying the RFP response and ii) waiving the exception, so that even if an exception is detected, selection of a resource provider for performance of the data processing task is enabled responsive to the detected exception being waived.

16. The computer program product of claim 15, wherein the method steps further comprise:
   accessing a database containing a set of exception; and
   determining the existence of an exception rule corresponding to the exception condition.

17. The computer program product of claim 16, wherein the exception rules may allow an exception dependent upon the extent to which the excepting condition is non-compliant with a corresponding RFP requirement.

18. The computer program product of claim 16, wherein the exception rules may allow an exception condition dependent upon the value of another parameter specified in the RFP.

19. The computer program product of claim 16, wherein the method steps further comprise the step of:
   enabling a user to update the exception rules database upon detecting an exception condition for which no exception rule is found.

* * * * *